Jan. 24, 1967  A. J. KOMPANEK, JR., ET AL  3,300,258
BEARING AND METHOD FOR MAKING SAME
Filed March 5, 1964
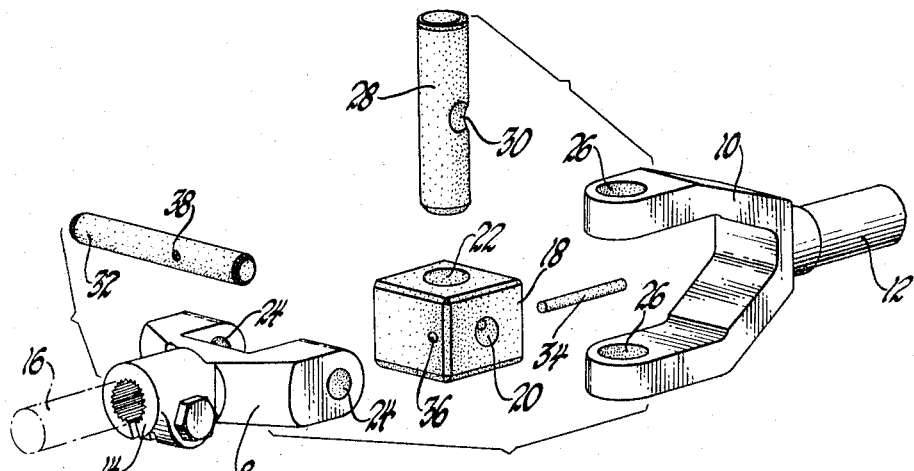
Fig. 1
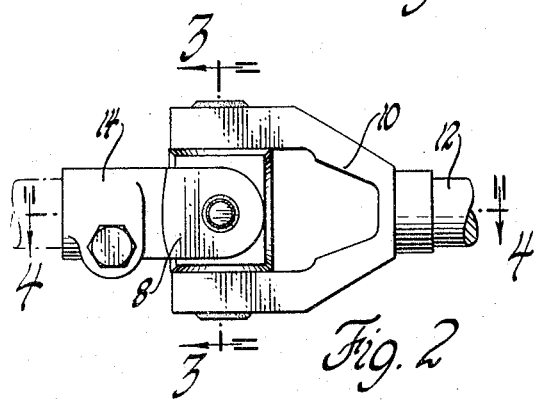
Fig. 2
Fig. 3
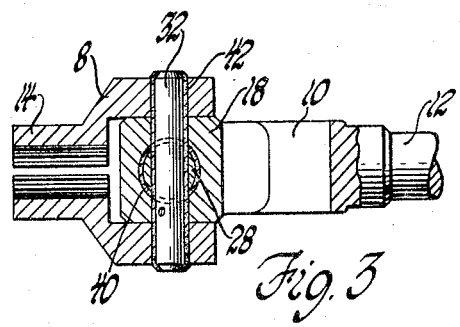
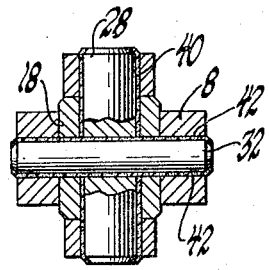
Fig. 4
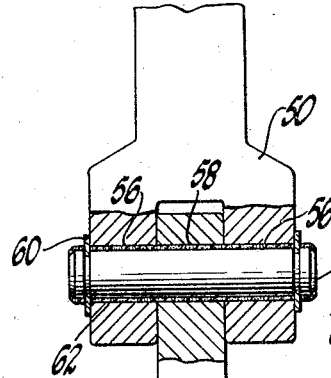
Fig. 5
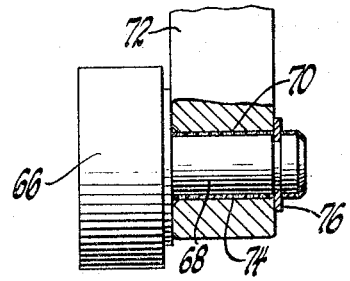
Fig. 6
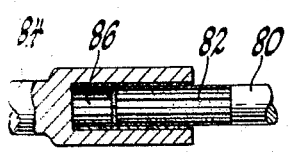
Fig. 7
INVENTORS
Andrew J Kompanek, Jr.
BY & John W. Sanderford
Barnard, McGlynn & Reising
ATTORNEYS United States Patent Office 3,300,258
Patented Jan. 24, 1967

3,300,258
BEARING AND METHOD FOR MAKING SAME
Andrew J. Kompanek, Jr., Lansdale, and John W. Sanderford, Neshaminy, Pa., assignors to Teleflex Incorporated, North Wales, Pa., a corporation of Delaware
Filed Mar. 5, 1964, Ser. No. 349,591
11 Claims. (Cl. 308—78)

The present invention relates to a new and improved bearing and method for manufacturing same. More specifically, the invention relates to bearings of the type wherein a member, for example a cylindrical rod or shaft, is surrounded by and in sliding engagement with a mated surface of another member to allow rotational or reciprocal movement therebetween. An example is a Hooke type universal joint wherein crossed pivot pins having their cylindrical ends in bearing engagement with clevises, provide the universal movement, one of the preferred embodiments of the invention constituting such a universal joint. Illustrative of other types of bearing structures wherein the invention finds utility are rotary shaft bearings, simple clevis or pivot joints wherein two members are joined by a cylindrical pin for pivotal movement with respect to each other and spline connections to allow axial but preclude rotary movement between the connected members.

Ideally, a bearing of the type described, such as a pivot or universal joint, a rotary shaft or the like, should allow free low friction movement and yet should provide the closest, most intimate contact between the mating surfaces. In a Hooke type universal joint, for example, it is essential to good efficiency that there be a minimum friction in movement of the parts and it is also essential that the parts fit to extremely close tolerance in order to prevent wind-up or backlash in the joint. To this end, it is conventional practice to machine the mating cylindrical surfaces to very close tolerances. However, this does not accomplish the ultimate in performance because it is virtually impossible as a practical matter to machine and polish two non-planar surfaces to mate with complete precision. When the fit is made extremely close, there is generally binding or undue friction and where the fit is made loose there is undesirable slop in the joint. Of course it is possible to accomplish a good fit between the mating surfaces by forming one of them of a soft material which can be pressed or molded into intimate engagement with the other. However, this has the disadvantage that the soft material is subject to greater wear than if it were a harder material. Hence, after a period of use, undesirable slop develops in the joint. Where there is a loose fit, either initially or by reason of wear, the bearing surfaces rapidly disintegrate particularly where the operational environment is such that the bearing or joint is subject to dirt or grit. For example, in tracked vehicles and other off-the-road equipment, exposed pivot joints and cylindrical bearings have a notoriously short life because of the destructive effect of sand and other gritty materials which seep between the mating cylindrical bearing surfaces. In road vehicles such as automobiles and trucks universal joints and the like generally require protective rubber or leather boots to prevent similar effect. In universal joints, loose fit leads to rapid wear, even in an environment free of abrasive grit, especially where there are rapid changes in the rotational velocity of the rotary motion being transmitted.

The present invention has as its main object the provision of an improved bearing and method for making same wherein an extremely close and yet low friction slidable fit between mating surfaces is accomplished. Briefly, the invention comprehends forming the male member of the bearing or joint with a slightly greater diameter than that of female member into which it is to be fitted, the surface of at least one and preferably both of the members being coated with a dry lubricant, and then press or interference fitting the male member into the female member. This accomplishes a substantially perfect fit and yet surprisingly there can be free low friction sliding movement between the mated parts. Because of the press or interference fit, the parts are so closely mated that it is virtually impossible for abrasive materials such as sand or grit to work between them. Further, the mated parts can be made of hard metals as, for example, in one of the embodiments hereinafter described wherein the parts are of steel and are nitrided to provide extremely hard surfaces. Hence, the bearings have exceptionally long life.

The above and other objects, features and advantages of the invention will appear more clearly from the following detailed description of various embodiments thereof made with reference to the accompanying drawings in which:

FIGURE 1 is an exploded view of a Hooke type universal joint made in accordance with the invention;

FIGURE 2 is a side view of the universal joint shown in FIGURE 1 with the parts in their assembled relationship;

FIGURE 3 is a sectional view taken on the line 3—3 of FIGURE 2;

FIGURE 4 is a sectional view taken on the line 4—4 of FIGURE 2;

FIGURE 5 is a view in partial section of another embodiment, in this instance a pivot joint, constructed in accordance with the invention;

FIGURE 6 is a view in partial section of still another embodiment, in this instance a cylindrical bearing for a wheel, made in accordance with the invention; and FIGURE 7 is a side view partially in section of a spline connection made in accordance with the invention.

Referring now to FIGURE 1, the universal joint comprises a pair of clevis members 8 and 10, the latter constituting the terminus of a shaft 12 and the former having a fitting 14 to secure thereto a shaft 16 for transmitting rotary motion through the joint. The clevis members extend in planes transverse of each other and positioned between them is a swivel block 18 having communicating bores 20 and 22 therethrough at right angles to each other, bore 20 being aligned with bore 24 in the ends of clevis member 8, and bore 22 being aligned with bore 26 in the ends of clevis member 10. A cylindrical pin 28 of relatively large diameter and having a bore 30 therethrough at right angles to its longitudinal axis extends through aligned bores 26 and 22 to provide a pivotal connection between clevis member 10 and block 18, and a cylindrical pin 32 of relatively small diameter extends through bores 24, 20 and 30 to provide a pivotal connection between the block and clevis member 8. Pin 28 is maintanied in its assembled relationship by means of pin 32 extending through the bore 30, and pin 32 is retained in position by means of a small retainer wire 34 which is press-fitted into an opening 36 in the block 18, which communicates with bore 20, the inned end of the wire 34 engaging a small hole 38 in the pin 32. If desired the wire can pass through only one side of the block and engage a blind hole in the pin 32. The wire 34 can be formed with a roughened or ribbed surface to assure its being retained in assembled relationship.

In accordance with the invention, the cylindrical pins 28 and 32 and the walls of bores 20, 22, 24, 26 and 30 are coated with a solid dry lubricant and each of the coated pins 28 and 32 is press-fitted into the bores with which it mates. Hence, the pins are extremely closely fitted with their mating bores as a characteristic of a press-fit engagement and yet by reason of the film of dry lubricant there is free pivotal movement between the clevises and the pins. A more thorough understanding of the structure of the universal joint shown will be had from the following detailed description of the method used for its manufacture.

The clevis members 10 and 12 were formed of SAE 416 stainless steel and the block 18 and cylindrical pins 28 and 32 of SAE 440 stainless. These parts were machined such that the outer diameters of pins 28 and 32 were about 0.001 inch smaller than the internal diameter of the bores into which they were to be mated. Then all these parts were nitrided by heating to about 1000-1050° F. for 30 hours in an ammonia atmosphere to provide the surfaces thereof with a hard nitrided casing. After cooling the pins 28 and 32 and the walls of the bores 20, 22, 24, 26 and 30 were coated with a solid dry lubricant composition consisting essentially of a slurry of finely divided dry lubricative powder in an aqueous solution containing phosphate (i.e. $PO_4^{---}$, $HPO_4^{--}$, $H_2PO_4^{-}$), chromate (i.e. $CrO_4^{--}$, $Cr_2^{--}O_7^{-}$) and metal ions, such being the subject matter of United States patent application Serial No. 291,289 filed June 28, 1963 in the name of Charlotte Allen and assigned to the assignee of the present invention. Specifically, the composition used was as follows:

| | |
|---|---|
| $H_3PO_4$ (85%) _____ cc__ | 20 |
| $MgCr_2O_7 \cdot 6H_2O$ _____ g__ | 16 |
| MgO _____ g__ | 5 |
| $Mg(H_2PO_4)_2 \cdot 3H_2O$ _____ g__ | 5 |
| $H_2O$ to 100 cc. | |
| Molybdenum disulfide powder (about 10 micron particle size) _____ g__ | 80 |

After spraying such composition onto the surfaces, the parts were dried and then heated to about 625° F. for thirty minutes to fully cure the material as set forth in the aforesaid U.S. patent application. Upon curing the coating comprises molybdenum disulfide bonded by an inorganic matrix containing substantial phosphate, presumably a complex amorphous material. The coating has excellent lubricity, adhesion, wear resistance and heat resistance and has sufficient flexibility that it can be worked or drawn with the metal.

The finished cured coatings had a thickness of about 0.002 inch thereby reducing the diameters of the bores by 0.004 inch and increasing the diameters of the pins by 0.004 inch. Then the coating on each of the surfaces was compacted, as by swaging, to reduce its thickness to about 0.001 inch. After the compacting operation, the coated surfaces of the pins and bores were accurately machined to size each of the coated pins to a diameter about 0.0005 inch greater than that of bores into which it was to be press fitted. Hence, the average coating thickness on each of the surfaces at the conclusion of the machining operation was about 0.0005 inch. Pin 28 was then pressed into aligned bores 26 and 22 and pin 32 pressed into aligned bores 20, 24 and 30 after which wire 34 was swaged into hole 36 to engage blind hole 38 in the pin 32 to complete the assembly. Insertion of the pins 28 and 32 into the bores was simplified by providing a slight taper on the ends of the pins as shown. Albeit considerable force was required to press the 0.0005 inch oversized pins onto the bores, there was excellent low friction pivotal movement between the assembled parts, and with no loose play whatsoever between the mated surfaces. Hence, the universal joint was substantially free of wind-up or backlash. In FIGURES 3 and 4 the dry lubricant coatings between pin 28 and its mated bores are indicated at 40 and the coatings between pin 32 and its bores are indicated at 42. The coatings are, of course, shown with greatly exaggerated thickness merely for purposes of illustration, the actual thickness of each of the coatings in the press fitted parts being on the order of 0.00025 inch.

The preferred embodiment of the invention described above provides the ultimate in a low-friction micro precision joint and finds utility in jet aircraft control mechanisms, for example, where efficient backlash free response is essential to meet performance requirements. The assembly is backlash free as manufactured because of the perfect fit between press fitted mated bearing surfaces, and continues so for extensive periods of operation, particularly by reason of the nitride hardened lubricant backing surfaces. The dry lubricant film provides excellent low friction operation throughout the life of the joint without requirement for grease, oil or other wet lubricant. Hence, the joint can operate in a relatively high temperature environment. Also, because of the perfect fit between mated bearing surfaces, the operation and durability of the joint is not affected by the pressure of dust, dirt or other abrasive materials since it is impossible for such material to seep between the mated surfaces. Hence, there is no requirement for a protective seal around the joint. In addition to serving as a lubricant, the coatings serve to dampen vibration eliminating the usual metal against metal brinelling effect. Micro imperfections and minor tolerance variations on the mated surfaces are without ill effect since the press fit of the parts burnishes and works the coatings to level the imperfections and take up the tolerance variations. When, after extensive use, there is requirement to rebuild the joint, the job is simple and inexpensive in that it is only necessary to disassemble the pins, block and clevises, remove the coatings as by blasting with fine abrasive, and then recoat, compact, machine and press fit into reassembled relationship as described above. None of the parts need be discarded. Accurate machining of the coatings is relatively simple with little wear on tools, the coating described being excellent in this regard also.

The requirements for the lubricative coating are (1) good inherent lubricity (2) good adhesion to metal (3) relatively good flexibility and workability under pressure such that it compacts and can flow and be burnished during press fitting of the parts and (4) ability to take the load requirements of the joint or bearing. By far the preferred dry lubricants are those covered by the aforementioned United States patent application, such lubricants comprising, in the liquid state in which they are applied, a slurry of finely divided dry lubricant powder in an aqueous solution containing substantial amounts of metal ion, phosphate ion, and chromate ion. Molybdenum disulfide alone or in combination with graphite or other dry lubricant is excellent as the additive particulate material because of its good load carrying capacity, the particular coating composition set forth above being ideal. Where lesser load carrying capacity is required, lubricative coatings containing polytetrafluoroethylene can be used if desired. Such coatings are the subject matter of United States patent applications Serial No. 291,248 and Serial No. 291,358 both filed June 28, 1963 and assigned to the assignee of the present invention, the disclosure of these patent applications along with that previously mentioned being incorporated herein by reference. Whereas such compositions are preferred, it will be understood that the invention also comprehends the use of other dry lubricants, for example, phenolformaldehyde or other organic resin bonded graphite, molybdenum disulfide or the like dry lubricant powders as are known in the art.

FIGURE 5 shows a simple pivot joint embodying the invention. It comprises a clevis 50, a member 52 extending into the bifurcated end of the clevis and pivoted thereto by pin 54 which extends through aligned bores 56 and 58 in the clevis and pivoted member respectively. A pair of split washers 60 engaged in circumferential grooves in the ends of the pin 54 retain the pin in the bores. In accordance with the invention the pin and the surfaces of the bores are coated with a solid dry lubricant 62, the diameter of the coated pin being initially slightly greater than that of the bores and the pin then being press fitted into the bores as described above with reference to the FIGURES 1-4 embodiment.

If desired, one of the mated members, for example, the pin 54, can be made of a somewhat softer metal than that of the members 50 and 52 and can be machined or otherwise formed to a diameter about the same as or even slightly greater than the diameter of the bores whereby after coating with the lubricant and upon press fitting, the relatively soft pin is swaged by its contact with the bores to the precise diameter required for a perfect fit. During the swaging which occurs the lubricative coating draws with the metal of the pin and hence the completed assembly provides excellent low friction pivotal movement between the pivoted members. One manner of accomplishing the differential in hardness is to nitride harden the members 50 and 52 but not nitride harden the pin 54. Of course, it is also possible to use different steels or other metals to provide the hardness differential. The use of different hardness metals for the mated members has the advantage of somewhat simplifying and reducing the cost of manufacture since less accurate machining is required on the softer member, the softer member being swaged to its final stage during the press fitting operation. Such has the disadvantage, however, of providing a slightly less durable joint than where both members are hard since the softer material will be somewhat more subject to distortion or wear. For most applications, however, the durability will be more than adequate to meet the operation requirements and it will be understood that even though one of the mated members is of a softer material the performance characteristics and durability of joints made in accordance with the present invention are by far superior to those of conventional joints.

The structure shown in FIGURE 5 is useful, for example, as a permanently lubricated close tolerance pivot joint for off-the-road vehicles or for the attachments or implements therefor and has the advantage in that its operation and durability are not affected by abrasive dust and grit in which it is required to operate.

In FIGURE 6 there is shown a roller 66 having a cylindrical shaft 68 rotatably supported in the bore 70 of a support member 72, the bearing engagement of the shaft and the bore being formed in accordance with the present invention. That is, the shaft and preferably also the bore, is coated with a dry lubricant film 74, and the shaft is initially slightly oversized in diameter and is interference fitted into the bore. The shaft is held in the bore by a split washer 76 which engages a groove in the end of the shaft. This embodiment is useful, for example, as the track support rollers for various types of tracked vehicles.

FIGURE 7 shows a spline connection to permit elongation and contraction of a torque transmitting drive shaft. The connection comprises shaft section 80 having its end formed with elongate axially extending circumferentially arranged ridges and grooves 82 and shaft section 84 having a tubular shaped end portion with interior elongated ridges and grooves 86 which mates with those on shaft section 80.

In accordance with the invention the end of shaft 80 is initially made slightly oversized and is coated with a dry lubricant film as is preferably also the interior surface at the end of shaft 84. Then the shaft 80 is press fitted into shaft 84 thereby providing a perfect mated surface contact between the teeth and the grooves on the two members. Even though there is a press fit, the shaft 80 can reciprocate freely in shaft 84 because of the thin film of dry lubricant. Hence, an excellent spline connection completely free of wind-up or backlash can be manufactured without dependence on extremely accurate machining of the ridges and grooves. It will be manifest that the invention will also find utility for accomplishing at relatively low cost a perfect mated bearing connection for cylindrical plungers or for pistons with their cylinders. An almost perfect seal can be attained because of the substantially perfect mating of the press fitted parts and yet there can be free relatively low friction reciprocative movement between the parts because of the lubricative film.

It will be understood that while the invention has been described with reference to certain embodiments thereof, various changes and modifications may be made all within the full intended scope of the claims which follow:

We claim:

1. A bearing assembly comprising first and second bearing members respectively having contacting surfaces, each of said bearing members including a metal member, at least one of said metal members having bonded thereto a solid dry lubricant film including an inorganic material forming the contacting surface of said bearing member, the contacting surface of one of said bearing members being surrounded by and in closely mated contact with the contacting surface of the other of said bearing members, and said film being formed to its final closely mated shape by press fitting one of said bearing members into the other of said bearing members.

2. A bearing assembly as set forth in claim 1 wherein said mated surfaces are cylindrical.

3. A bearing assembly as set forth in claim 2 wherein said film consists essentially of a lubricant powder bonded by a matrix of inorganic material.

4. A bearing assembly as set forth in claim 3 wherein said matrix contains phosphate.

5. A bearing assembly as set forth in claim 4 wherein said matrix consists essentially of a dried heat cured aqueous solution containing dissolved phosphate, dissolved chromate and dissolved metal.

6. A bearing assembly comprising first and second bearing members respectively having contacting surfaces, each of said bearing members including a metal member having bonded thereto a solid dry lubricant film including an inorganic material forming the contacting surface of each of said bearing members, the contacting surface of one of said bearing members being surrounded by and in closely mated contact with the contacting surface of the other of said bearing members, and at least one of said films being formed to its final closely mated shape by press fitting one of said bearing members into the other of said bearing members.

7. A bearing assembly as set forth in claim 6 wherein said film consists essentially of a lubricant powder bonded by a matrix of inorganic material.

8. A bearing assembly as set forth in claim 7 wherein said matrix consists essentially of a dried heat cured aqueous solution containing dissolved phosphate, dissolved chromate and dissolved metal.

9. A bearing assembly as set forth in claim 8 wherein each of said metal members is formed from metal of substantially the same hardness.

10. A bearing assembly as set forth in claim 9 wherein said metal is hardened steel.

11. A bearing assembly as set forth in claim 10 wherein each of said films are less than .001 inch in thickness.

References Cited by the Examiner

UNITED STATES PATENTS

| 2,813,409 | 11/1957 | Wolcott | 64—17 |
| 3,096,128 | 7/1963 | Wight. | |
| 3,130,991 | 4/1964 | Piragino | 308—238 |

FOREIGN PATENTS 711,620  7/1954  Great Britain.

OTHER REFERENCES

Bonded Coatings Lubricate Metal Parts, published in Product Engineering, Sept. 5, 1960, pp. 48 through 53 relied upon.

MARTIN P. SCHWADRON, *Primary Examiner.*

FRANK SUSKO, DAVID J. WILLIAMOWSKY,
*Examiners.*